(12) United States Patent
Samaniego

(10) Patent No.: US 6,255,981 B1
(45) Date of Patent: Jul. 3, 2001

(54) METHOD FOR RANGE ALIGNMENT AND ROTATION CORRECTION OF A HIGH RESOLUTION IMAGE IN AN INVERSE SYNTHETIC APERTURE RADAR SYSTEM

(75) Inventor: Raymond Samaniego, Plano, TX (US)

(73) Assignee: Raytheon Company, Lexington, MA (US)

(*) Notice: Subject to any disclaimer, the term of this patent is extended or adjusted under 35 U.S.C. 154(b) by 0 days.

(21) Appl. No.: 09/368,867

(22) Filed: Aug. 4, 1999

(51) Int. Cl.$^7$ .................................................. G01S 13/90
(52) U.S. Cl. ........................................... 342/25; 342/195
(58) Field of Search ............................. 342/25, 195, 191

(56) References Cited

U.S. PATENT DOCUMENTS

| H1720 | * | 4/1998 | Chen | 342/25 |
|---|---|---|---|---|
| 4,924,229 | | 5/1990 | Eichel et al. | 342/25 |
| 5,343,204 | * | 8/1994 | Farmer et al. | 342/25 |

\* cited by examiner

*Primary Examiner*—Ian J. Lobo
(74) *Attorney, Agent, or Firm*—Baker Botts L.L.P.

(57) ABSTRACT

A method for range alignment and rotation correction of a high resolution image in an inverse synthetic aperture radar (ISAR) system is provided that includes an ISAR image generator (14). The ISAR image generator (14) receives a full aperture (24) of data samples (20) that is then subdivided into a plurality of subapertures (26). A coarse image generator (40) generates a coarse image (70) for each subaperture (26). A composite image generator (42) generates a composite magnitude image (72) and a composite power image (74) from the coarse images (70). A point select module (44) uses the composite magnitude image (72) and the composite power image (74) to select a set of prominent points (76). A range alignment module (46) uses the coarse images (70) and the prominent points (76) to determine a range alignment correction for each coarse image (70). A rotation correction module (48) uses the composite power image (74) and the prominent points (76) to determine a point of rotation and rotational correction for each coarse image. A coarse image correction module (50) applies the range alignment correction and the rotational correction to each coarse image (70). An autofocus module (52) uses a phase gradient autofocus algorithm to correct phase errors occurring across coarse images (70). Coarse image combiner (54) combines the set of coarse images (70) into a single higher resolution image (75). Image formatter (56) generates ISAR image (58) for display on a display device (15) from high resolution image (75).

14 Claims, 5 Drawing Sheets

METHOD FOR RANGE ALIGNMENT AND ROTATION CORRECTION OF A HIGH RESOLUTION IMAGE IN AN INVERSE SYNTHETIC APERTURE RADAR SYSTEM

TECHNICAL FIELD OF THE INVENTION

This invention relates in general to the field of radar imaging systems, and more particularly to a method for range alignment and rotation correction of a high resolution image in an Inverse Synthetic Aperture Radar system.

BACKGROUND OF THE INVENTION

Inverse Synthetic Aperture Radar (ISAR) is a radar signal processing technique used to form images of moving targets. The ISAR may be mounted on a movable platform such as an airplane or ship. For example, an airplane may use an ISAR to produce radar images of a speedboat. A two-dimensional image can be formed by separating radar returns from an object in range and frequency. Different points along a rotating object will have different line of sight velocities in the direction of the radar sensor thus giving different Doppler shifts. If no corrections are made, nonlinear Doppler shifts can often result in defocused images. Likewise, uncorrected range variations can cause blurred images.

Radar imaging systems generally use a tracker to maintain a target within the radar range gate. The tracker locates a high intensity point on the target to track, determines the range to the target, and controls the radar pulse timing. One of the challenges in ISAR is keeping a track on the moving target in real time in order to keep radar returns from each point on the object in the same radar sensor range bin over the data collection interval. For very high resolution radar systems, the challenge becomes even more difficult.

With ISAR, imaging of dynamic targets causes range tracker jitter (uncompensated translational motion) and range migration (rotational motion) that results in unfocused images with poor image quality. If digital pulse compression is used, range tracker jitter can induce a large amount of phase noise in the target radar returns resulting in poor image quality.

Due to the aforementioned problems, conventional ISAR systems are inadequate to generate high quality ultra-high resolution radar images.

SUMMARY OF THE INVENTION

From the foregoing, a need has arisen for a method for range alignment and rotation correction of a high resolution image in an Inverse Synthetic Aperture Radar system that provides a high resolution radar image. In accordance with the present invention, a method for range alignment and rotation correction of a high resolution image in an Inverse Synthetic Aperture Radar system is provided that substantially eliminates or reduces disadvantages or problems associated with conventional Inverse Synthetic Aperture Radar systems.

According to one embodiment of the present invention, there is provided a method for range alignment and rotation correction of a high resolution image in an Inverse Synthetic Aperture Radar system that comprises generating a plurality of coarse images from a full aperture of range compressed radar data samples. Each coarse image is generated from an overlapping subaperture of the data samples contained in the full aperture of data samples. Prominent points are selected from the plurality of coarse images. The radar images existing on the plurality of coarse images are aligned using the prominent points to remove translational movement and range migration that may exist between the coarse images. Phase errors are then removed from the plurality of coarse images using a phase gradient autofocus. The plurality of coarse images are next combined to form a single image of higher resolution. The higher resolution image is then formatted for display on a display device.

Technical advantages of the present invention include providing an efficient method for range alignment and rotation correction of a high resolution image in an Inverse Synthetic Aperture Radar system. In particular, the system range aligns a series of coarse radar images to compensate for range tracker jitter errors. In addition, the system compensates for rotational movement of a target in the coarse radar images. The system combines these range-aligned and rotation-corrected coarse images to create a higher resolution radar image. Other examples may be readily ascertainable by those skilled in the art from the following figures, descriptions, and claims.

BRIEF DESCRIPTION OF THE DRAWINGS

For a more complete understanding of the present invention and the advantages thereof, reference is now made to the following description taken in conjunction with the accompanying drawings, wherein like reference numbers represent like parts, and in which.

DETAILED DESCRIPTION OF THE INVENTION

Figure 1:
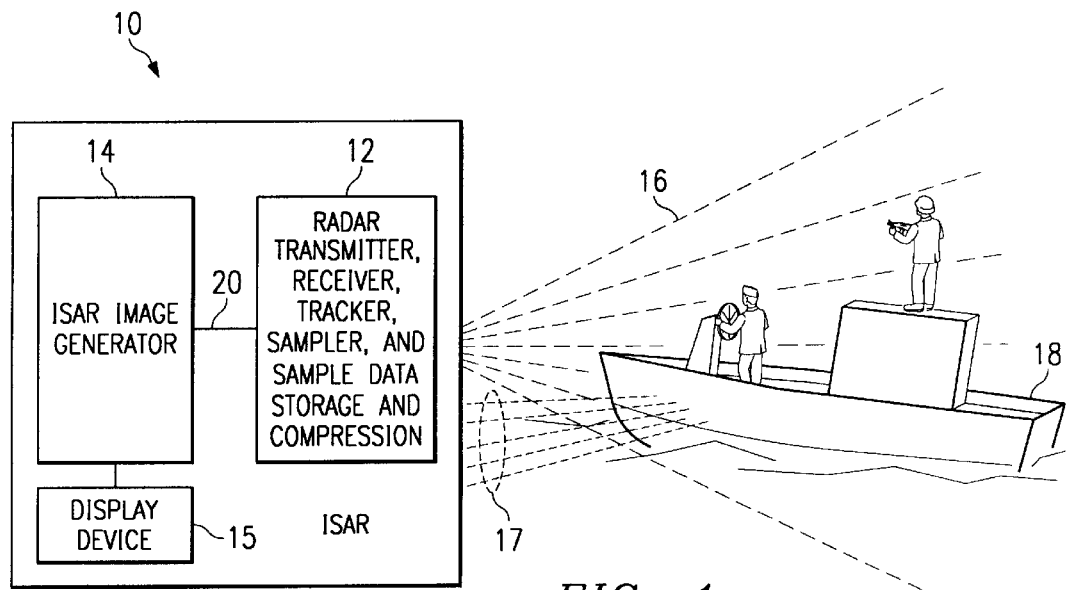
FIG. 1 is a block diagram illustrating an Inverse Synthetic Aperture Radar system (ISAR)

Referring to FIG. 1, an Inverse Synthetic Aperture Radar (ISAR) system is generally indicated at 10. ISAR 10 includes a radar unit 12, an ISAR image generator 14, and a display device 15. Radar unit 12 transmits radar signals 16 and receives return radar signals 17 reflected off of a target 18. Radar unit 12 includes a radar pulse generator, a radar return receiver, a tracker, a sampler, and a data storage device. Raw sampled data is generated from the return radar signals 17 and is range-compressed and forwarded to ISAR image generator 14 as range-compressed data samples 20. Image generator 14 processes data samples 20 and generates a radar image for display on display device 15.

ISAR 10 pulses radar unit 12 to obtain an image of target 18. The tracker of radar unit 12 uses return radar signal 17 to locate a high intensity point on target 18 in order for radar unit 12 to track movement of target 18. Radar unit 12 determines the range to target 18 and sets a range gate based on the high intensity point. Radar unit 12 is then pulsed a fixed number of times determined to obtain adequate target data for processing and image generation. The fixed number of radar pulses collects a full aperture of target data. In one embodiment, a full aperture of target data is the target data collected from 256 pulses of radar unit 12. The full aperture of data samples is range-compressed and forwarded to ISAR image generator 14 for processing and image generation.

Figure 2:
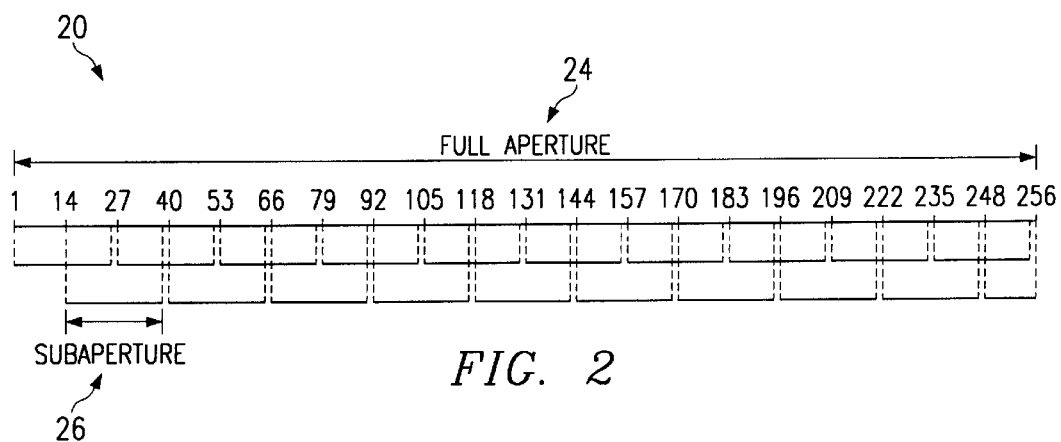
FIG. 2 is a graph illustrating a full aperture of range compressed data samples divided into a plurality of overlapping subapertures.

Referring to FIG. 2, a graph illustrating range compressed data samples 20 is illustrated. Range compressed data samples 20 are obtained from a fixed number of radar pulses of radar unit 12. The fixed number of radar pulses collects a full aperture 24 of range compressed data samples 20. Data samples 20 include a set of range compressed data for each pulse of radar unit 12 in full aperture 24. In one embodiment, range compressed data samples 20 includes 256 sets of data samples corresponding to 256 pulses of radar unit 12. Full aperture 24 is subdivided into a number of overlapping subapertures 26. The number of overlapping subapertures is chosen to provide high resolution within the processing capabilities of ISAR 10. In one embodiment, twenty overlapping subapertures 26 are used that overlap by approximately 50%. The overlapping percentage could be any percentage determined to yield adequate sampling of range compressed data samples 20. In one embodiment, radar pulses 1 through 26 represent the first subaperture 26, radar pulses 14 through 39 represent the second subaperture 26, radar pulses 27 through 52 represent the third subaperture 26, and so on until radar pulses 234 through 256 represent the twentieth subaperture 26.

Figure 3:
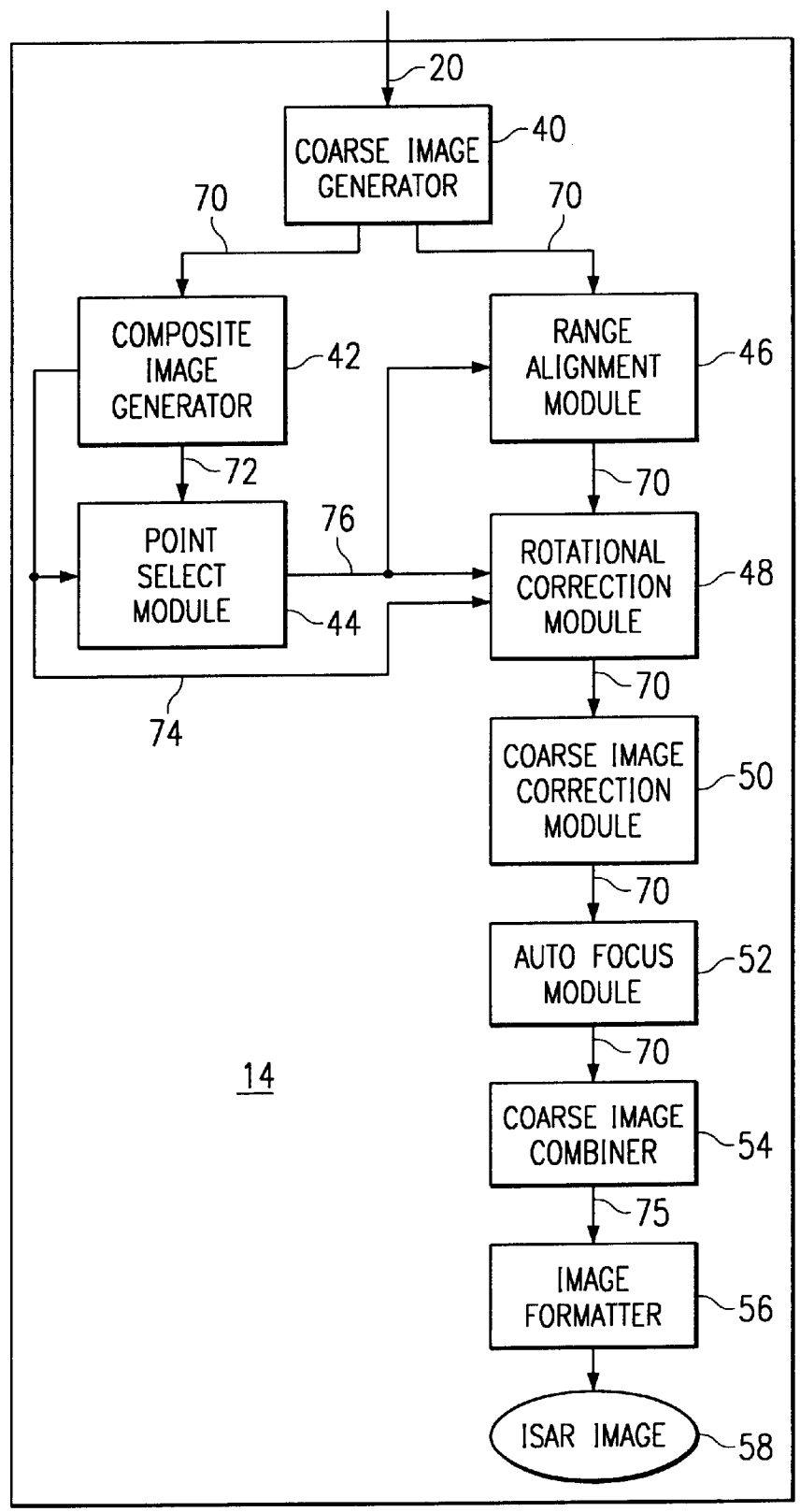
FIG. 3 is a block schematic diagram illustrating an ISAR image generator of the ISAR system.
Figure 4:
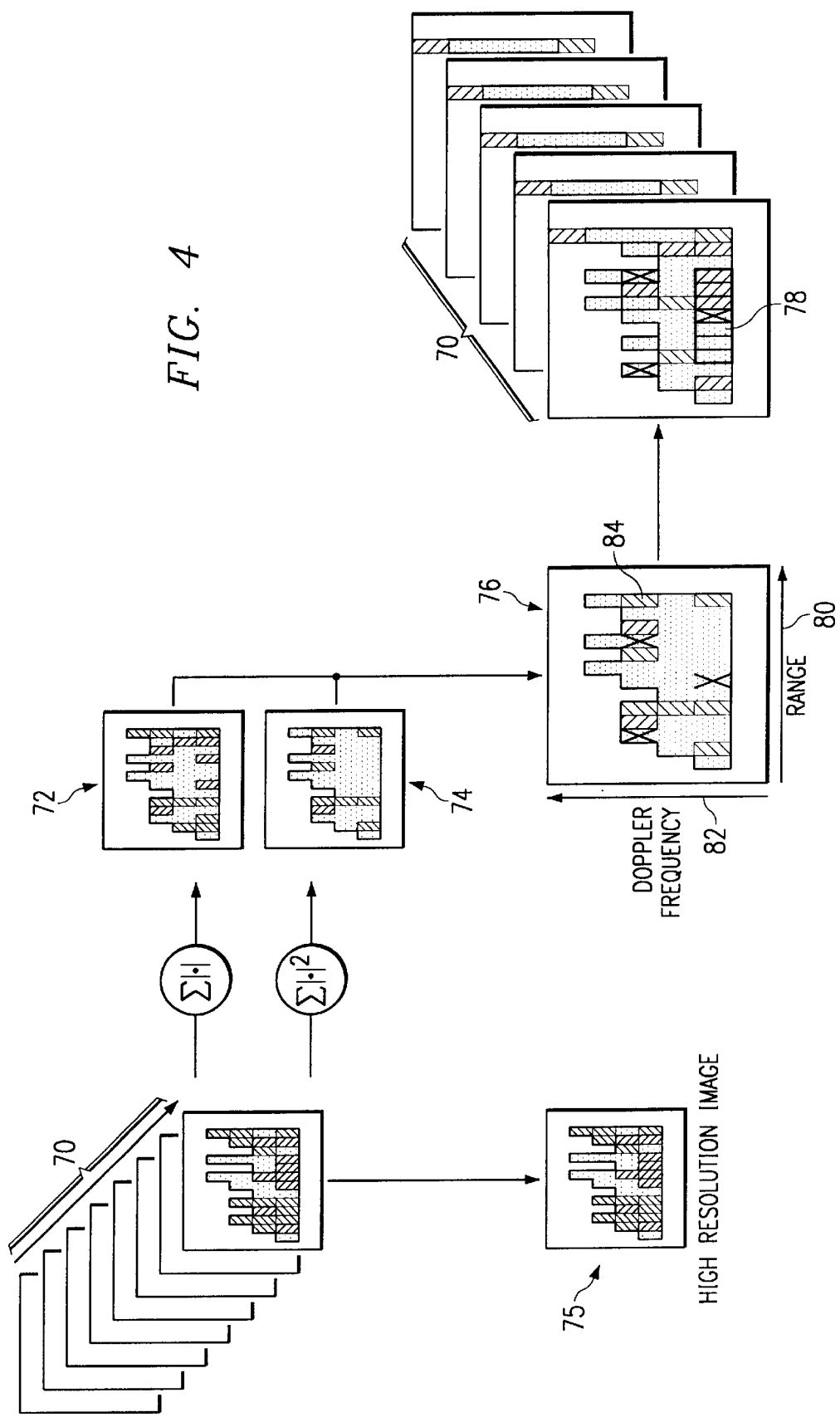
FIG. 4 is a block diagram illustrating coarse images, composite images, and prominent points determined by the ISAR image generator.

Referring to FIG. 3, the ISAR image generator is generally indicated at 14. ISAR image generator 14 receives range-compressed data samples 20 and produces an ISAR image 58 suitable for display on display device 15. ISAR image generator 14 includes a coarse image generator 40, a composite image generator 42, a point select module 44, a range alignment module 46, a rotation correction module 48, a coarse image correction module 50, an autofocus module 52, a coarse image combiner 54, and an image formatter 56. Referring to FIG. 4, the transformation of range compressed data samples 20 into coarse images 70, composite magnitude image 72, composite power image 74, and high resolution image 75 is illustrated. FIG. 3 and FIG. 4 will be discussed together in detail.

Coarse image generator 40 receives range-compressed data samples 20 and generates a plurality of overlapping subapertures 26. Coarse image generator 40 utilizes overlapping subapertures 26 to capture a series of coarse Doppler resolution radar images of target 18. The data samples within each overlapping subaperture 26 are combined creating a set of coarse images 70. In one embodiment of the present invention, twenty coarse images are generated corresponding to the twenty overlapping subapertures. Thus, the volume of data in range-compressed data samples 20 is combined and reduced to a set of coarse images 70.

Composite image generator 42 generates a composite magnitude image 72 and a composite power image 74 from coarse images 70. Composite image generator 42 accumulates the data from each coarse image 70 to create a single composite magnitude image 72. Composite magnitude image 72 represents the totality of data in range-compressed data samples 20. Composite power image 74 is similarly created except that the magnitude of each data item in coarse images 70 is squared prior to combining into composite power image 74. In radar image processing, squaring the magnitude of a data item yields the power, or intensity, of that data item.

A radar image is comprised of a two-dimensional array of bins 84. Bins 84 are analogous to pixels in video image processing. A bin 84 may also be referred to as a point on the radar image.

Point select module 44 uses composite magnitude image 72 and composite power image 74 to select and generate a set of prominent points 76. Prominent points 76 are the highest intensity and most consistent points, or bins, in coarse images 70. The most consistent points are points that have the least amount of scintillation through the full aperture of data samples. The highest intensity points with the least amount of variance comprises the set of prominent points 76. Prominent points 76 represent the bins that most probably contain a consistent point on target 18. Prominent points 76 can then be used to align each coarse image 70 accounting for movement in range and movement in rotation between each coarse image 70. Prominent points 76 are represented in FIG. 4 by an "X" in one or more bins 84.

Range alignment module 46 uses coarse images 70 and prominent points 76 to consistently align the radar image in each coarse image 70. Range alignment module 46 overlays a range window 78 over a number of bins 84 in each coarse image where a particular prominent point 76 is expected to be found. By locating each prominent point 76 within its associated range window 78, a particular coarse image 70 may be range aligned with the other coarse images 70. The method for range aligning coarse images 70 will be discussed in detail with reference to FIG. 5. By aligning each coarse image 70, a higher quality radar image can be generated.

Rotational correction module 48 uses a rate of change in range to determine a rotational correction for each coarse image 70. A composite power image 74 and prominent points 76 are used to determine a point of rotation for the radar coarse images 70. The point of rotation is used as a pivot point for a rotational correction for each coarse image 70. The method for determining a rotational correction for each coarse image 70 will be discussed in detail with reference to FIG. 6. By applying a rotational correction to each coarse image 70, a higher quality radar image can be generated.

Coarse image correction module 50 applies the range alignment correction and rotational correction to each coarse image 70. The range alignment correction and rotational correction work together to produce a higher quality radar image as compared to radar images that are not range aligned or rotationally corrected.

Auto focus module 52 uses a phase gradient auto focus algorithm to correct phase errors occurring across coarse images 70. Coarse image combiner 54 combines the set of coarse images 70 into a single higher resolution image 75. Image formatter 56 centers the radar image in display device 15 and sets the gray scale of each pixel in display device 15 corresponding to the intensity of the radar reflection received by ISAR 10.

Coarse images 70, composite magnitude image 72, composite power image 74, and high resolution image 75 may be generically referred to as radar images. Each radar image has a range axis 80 and a Doppler axis 82. The range axis 80 represents location, or movement, within range. The Doppler axis 82 represents a rate of change in range. For example, movement along the range axis represents a change in location with a consistent range. A change along the Doppler axis represents a rate of change in range relative to a reference bin such as a tracked point. It will be understood that any suitable reference bin or point may be used. An acceleration toward or away from ISAR 10 will result in a change along the Doppler axis 82. A bin 84 is referenced by its range axis index and Doppler axis index.

Figure 5:
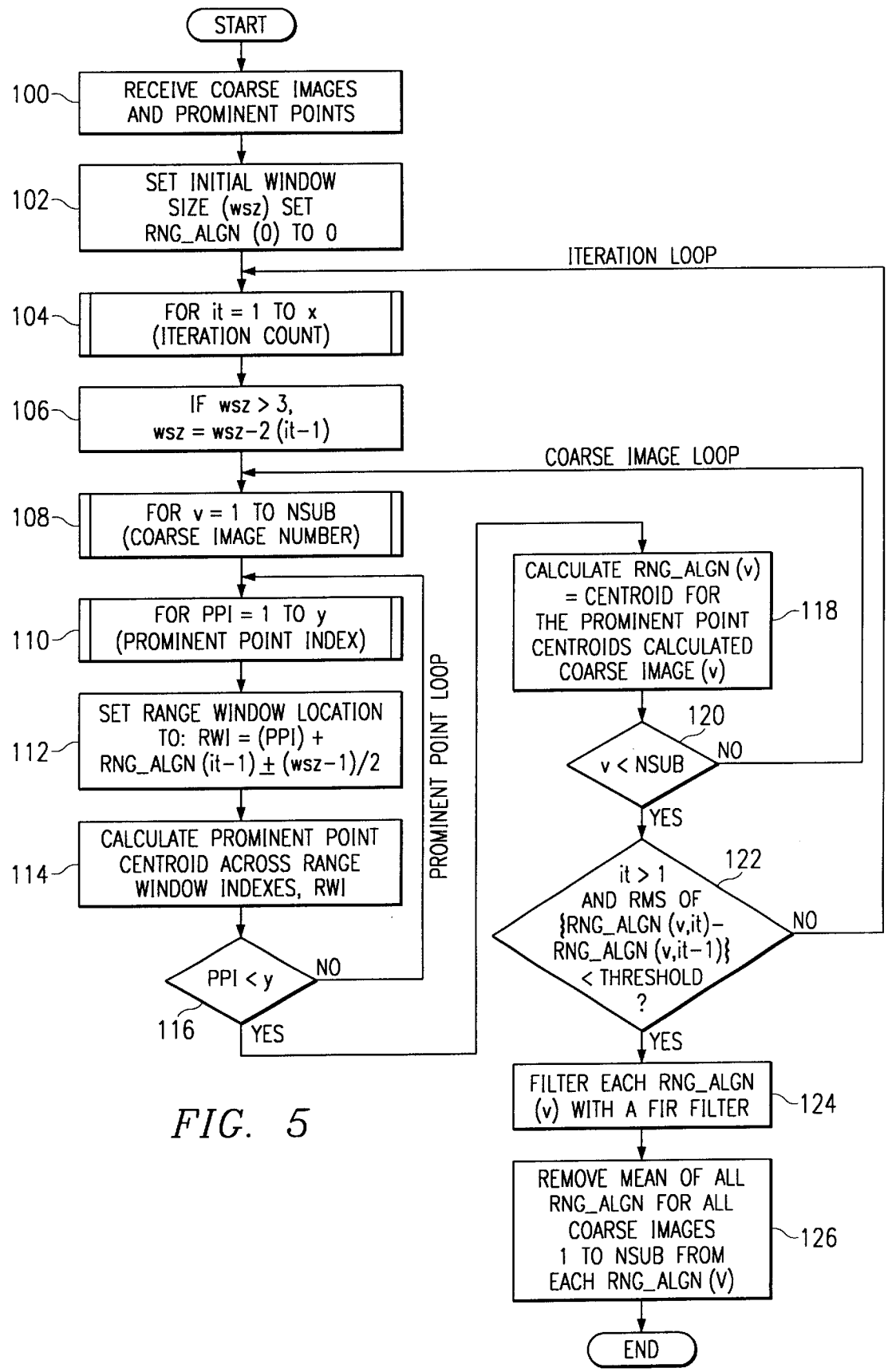
FIG. 5 is a flow diagram illustrating a method for range alignment.

Referring to FIG. 5, a flow diagram of a range alignment method is illustrated. As previously discussed, the real-time tracker follows a target 18 by tracking a single high-intensity radar return from the target 18. This results in a first level of alignment, but due to movement of the target 18 in relation to ISAR 10, the radar image of the target 18 may be in a different location in each coarse image 70 relative to the center of each coarse image 70. The change in relative location of the radar images results in range tracker jitter. When these unaligned radar images are combined, an unfocused radar image results. The range alignment method determines how much shifting is needed to align each coarse image 70 with all other coarse images 70. Thus, the range alignment for a particular coarse image 70 is a single quantity indicating a shift along the range axis 80 for the entire radar coarse image.

The range alignment process uses a range window 78 to identify the range area in which a particular prominent point should be found. The process then calculates a centroid of the bins in the range window 78. The centroid identifies the location of the particular prominent point 76 in range window 78 for that particular subimage, or coarse image 70.

The method for range aligning coarse images 70 begins at step 100 where range alignment module 46 receives coarse images 70 and prominent points 76. The method proceeds to step 102 where the range window 78 size is initialized to set the range window size for the first iteration through the method. In one embodiment, the initial range window size is set to nine bins. The range window size defines the area in which a particular prominent point 76 is expected to be found. The location of a particular prominent point 76 in range window 78 may vary between each coarse image 70 due to range tracker jitter. The method proceeds to step 104 where an iteration loop is initiated which will continue until at least two iterations are completed and the root mean square of the difference between the range alignments determined during the current iteration and the range alignments determined during the previous iteration is less than a threshold value. In one embodiment, the threshold value is 0.1 bin. The method is performed several times in order to determine the proper range alignment.

The method proceeds to step 106 where the range window size is reduced with each pass through the iteration. The range window size is reduced since the prominent points should be closer to the center of the range window with each pass through the iteration. The minimum range window size is 3 bins. In one embodiment, the iteration loop generally terminates by iteration number five at which time the range window size is 3 and the range alignment may not change any further.

The method proceeds to step 108 where a coarse image loop is started to calculate a range alignment for each coarse image 70. The loop continues until all coarse images 70 have been processed. In one embodiment, twenty coarse images are used requiring one iteration through the coarse image loop for each of the twenty coarse images.

The method proceeds to step 110 where a prominent point loop is started to process each prominent point 76 in each coarse image 70. The prominent point loop determines where each prominent point 76 lies within the range window 78 in the coarse image 70. The method proceeds to step 112 where the range window 78 is centered where the prominent point 76 is expected to be found. Specifically, one-half of the range window 78 will be left of the expected prominent point location and one-half of the range window 78 will be to the right of the expected prominent point location. The expected prominent point 76 location is determined from the location of the prominent point 76 in the composite power image 74 plus the range alignment factor for the coarse image 70 from the previous iteration. During the first iteration through the iteration loop, the expected prominent point location is equal to the location of the prominent point 76 in the composite power image 74.

At step 114, a prominent point centroid is calculated across the centered range window 78. The prominent point centroid uses each bin within the range window 78 to calculate the prominent point centroid. The calculated prominent point centroid is an intermediate step to determine a coarse image centroid, or range alignment, for the coarse image currently being processed.

The method proceeds to decisional step 116 where the prominent point loop count is compared to the total number of prominent points 76. If the prominent point loop counter is less than the total number of prominent points 76, the NO branch of decisional step 116 returns to step 110 to process the next prominent point 76 in the coarse image 70. If the prominent point loop counter is equal to the total number of prominent points 76, the YES branch of decisional step 116 leads to step 118.

At step 118, a range alignment for the coarse image 70 currently being processed is calculated as the centroid for the prominent point centroids calculated in step 114 of the prominent point loop. The method proceeds to step 120 where the coarse image loop counter is compared to the total number of coarse images 70. If the coarse image loop counter is less than the total number of coarse images 70, the NO branch of decisional step 120 returns to step 108 where the coarse image loop processes the next coarse image 70. If the coarse image loop counter is equal to the total number of coarse images 70, the YES branch of decisional step 120 leads to decisional step 122 where a determination is made whether the iteration loop is complete. Since at least two iterations through the iteration loop are necessary, step 122 returns to step 104 if the iteration loop counter is less than two. If the iteration loop counter is greater than one and the root mean square of the difference between the range alignments for each coarse image 70 in the current iteration and the range alignments for each coarse image 70 in the previous iteration are less than a threshold value, the NO branch of decisional step 122 returns to step 104 where a subsequent pass through the range alignment process (iteration loop) is performed. Otherwise, the YES branch of decisional step 122 leads to step 124. The iteration loop insures that the range alignments have converged between the two most recent passes through the iteration loop. In one embodiment, the iteration loop generally terminates by the fifth iteration.

At step 124, the range alignments for each coarse image 70 are filtered with a FIR filter to remove signals outside a specified frequency range. The method then proceeds to step 126 where the mean of the range alignments for all coarse images 70 is subtracted from the range alignment for each coarse image 70. This results in centering the range alignments for coarse images 70 at zero and insures that a minimal amount of image shifting is performed.

The following equation summarizes the range alignment process of FIG. 5. The equation is a centroid calculation of the bins 84 in range window 78.

For iteration "it", $$rng\_align_{it}(v) = \frac{\sum_{k=1}^{npsel} \sum_{i=-(nwind(it)+1)/2}^{(nwind(it)+1)/2} i \cdot |x'_{CI}(m_{ps}(k), i + i_{ps}(k), rng\_align_{it-1}(v), v)|^2}{\sum_{k=1}^{npsel} \sum_{i=-(nwind(it)+1)/2}^{(nwind(it)+1)/2} |x'_{CI}(m_{ps}(k), i + i_{ps}(k) + rng\_align_{it-1}(v), v)|^2}$$

$$v = 1, 2, \ldots, NSUB$$

where v=subaperture index (coarse image 70 number)
rng_align$_{it}$ (v)=range correction for subaperture v computed at iteration "it"
npsel=number of prominent points chosen
nwind(it)=size of range centroid window for iteration "it"
x'$_{CI}$=coarse image for subaperture v
m$_{ps}$ (k)=coarse Doppler bin for prominent point k
i$_{ps}$ (k)=range bin for prominent point k
NSUB=number of subapertures, or coarse images 70.

The following equation summarizes the FIR filtering step 124. The equation calculates a value rng_align' as an intermediate step between rng_align and the final alignment for the coarse image 70.

$$rng\_align'(v) = rng\_align(v) * FIR\_taps$$

where $$f_c = \begin{cases} 2 \cdot rngtrkbw, & 2 \cdot rngtrkbw < PRF/\Delta \\ (rngtrkbw + PRF/\Delta, & rngtrkbw < (PRF/\Delta) < 2 \cdot rngtrkbw \\ N/A, & \text{otherwise} \end{cases}$$

where rngtkbw=real-time range tracker bandwidth
PRF=Pulse Repetition Frequency
Δ=the spacing between subapertures in pulses The following equation summarizes removing the range alignment mean from each range alignment depicted in step 126. Rng_align" (v) is the final range alignment for coarse image number v.

$$rng\_align''(v) = rng\_align'(v) - mean(rng\_align'(1 \ldots NSUB))$$

Figure 6:
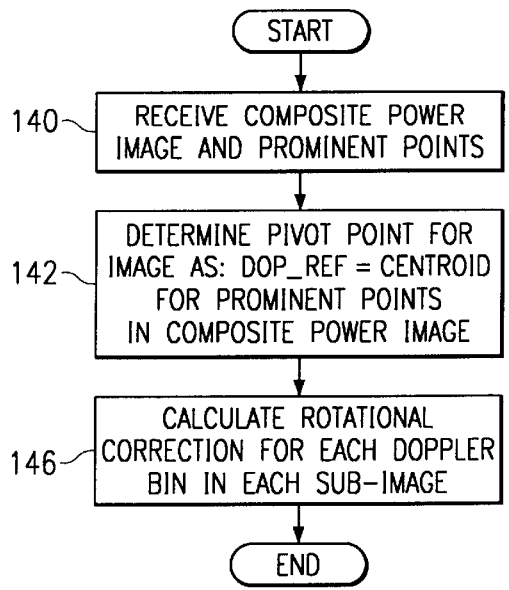
FIG. 6 is a flow diagram illustrating a method for rotation correction.

Referring to FIG. 6, the method for rotational alignment of the coarse images 70 is illustrated. The movement of a point on a target relative to a tracked point may result in range bin migration causing defocused radar images. Since full aperture 24 comprises a number of radar pulses and returns, the relative range for a particular point may vary from radar pulse to radar pulse. Since coarse Doppler bins are indeed coarse, the rotation is approximated by only shifting in range. In order to produce a high resolution radar image, the coarse images 70 are rotationally corrected to remove the effects of the range migration.

The method for rotation correction of coarse images 70 begins at step 140 where rotational correction module 48 receives composite power image 74 and prominent points 76. The method proceeds to step 142, where the pivot point for the coarse image is determined as a centroid for the prominent points 76 in composite power image 74. The pivot point is referred to as a Doppler reference. The following equation may be used to calculate the Doppler reference for the composite power image 74.

$$Dop.ref = \frac{\sum_{k=1}^{npsel} Powsum(m_{ps}(k), i_{ps}(k)) m_{ps}(k)}{\sum_{k=1}^{npsel} Powsum(m_{ps}(k), i_{ps}(k))}$$

where

Powsum=composite power image 74
npsel=number of prominent points chosen
m$_{ps}$ (k)=coarse Doppler bin for prominent point k
i$_{ps}$ (k)=range bin for prominent point k A derivation of the above equation is provided in Appendix A. The derivation illustrates the range alignment and rotation correction work together to produce a higher quality radar image.

The method proceeds to step 146 where a rotational correction for each Doppler bin 84 in each coarse image 70 is calculated. The rotation correction identifies the range migration for each bin in each coarse image 70. The it range migration represents rotation towards or away from ISAR 10 as evidenced by Doppler frequency shifts in the radar returns. The following equation may be used to calculate the rotation correction, or range migration correction.

$$rmig(m,v) = [(\lambda\Delta)/(2\delta_R)][(m - /Dop\_ref)/M][v - (NSUB+1)/2]$$

where m=Doppler axis index (row number)
v=subaperture index (coarse image number)
λ=the radar wavelength in meters
δ$_R$=the range pixel dimension in meters
M=number of pulses in each subaperture.

Figure 7:
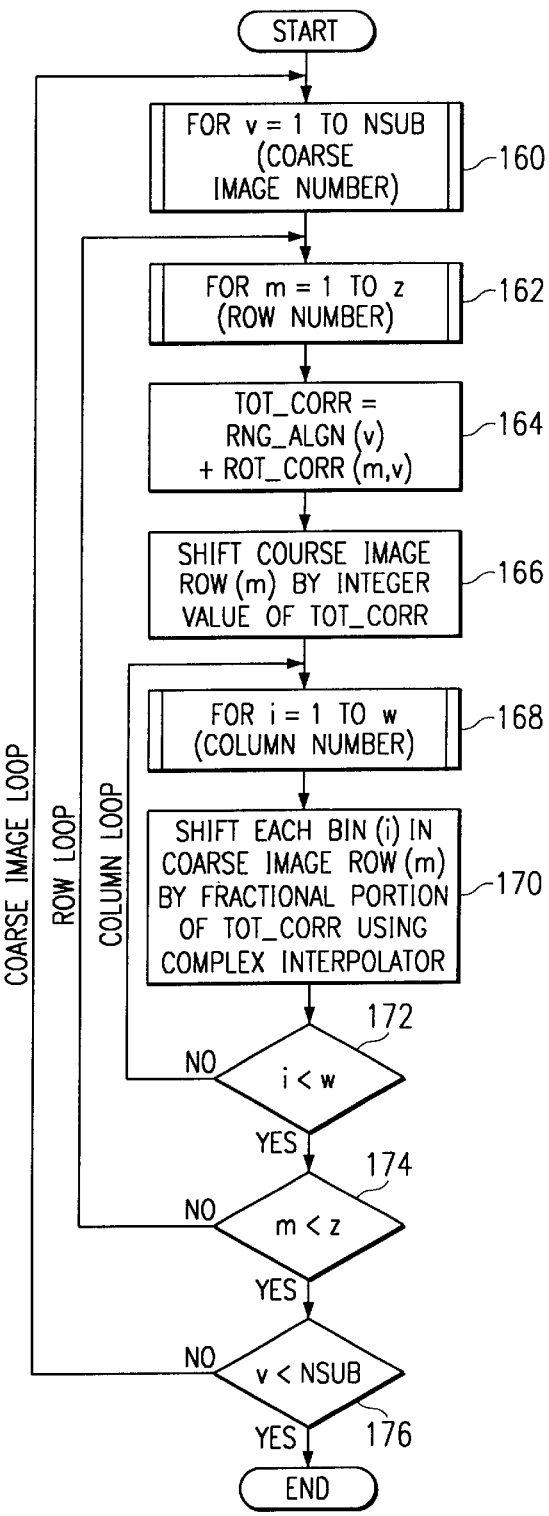
FIG. 7 is a flow diagram illustrating a method for simultaneously range aligning and rotationally correcting the coarse images.

Referring to FIG. 7, a method for applying the range alignment and rotation corrections to the coarse images 70 is illustrated. The method begins at step 160, where a coarse image loop is initiated. The coarse image loop causes each coarse image 70 to be range-aligned and rotationally corrected.

The method proceeds to step 162, where a Doppler bin loop is started. The Doppler bin loop corresponds to the coarse image row and continues until each row has been processed. The method proceeds to step 164, where a total correction is calculated from the sum of the range alignment for the coarse image 70 and the rotational correction for the Doppler bin and coarse image being processed. Thus, each Doppler bin, or row, will have a separate and distinct correction. The total correction simultaneously applies the range alignment and rotational correction to the coarse image 70.

The method proceeds to step 166, where the coarse image row identified by the Doppler bin number is shifted by the integer portion of the total correction. The coarse image row is shifted to the right if the total correction is positive, and to the left if the total correction is negative.

The method proceeds to step 168 where a column loop is started to interpolate and apply the fractional portion of the total correction to each bin in the coarse image row referenced by the Doppler bin number. The column loop will continue until each column in the coarse image row has been processed. The method proceeds to step 170 where each bin in the coarse image row is shifted by the fractional portion of the total correction using a complex interpolator. The complex interpolator may take the form of the following equation:

$$z_{int}(i) = \cos\left(\frac{\pi}{3}(i-\mu)\right)\frac{\sin(\pi(i-\mu))}{N\sin(\pi(i-\mu)/N)}e^{-j\pi\frac{\delta_r}{\rho_r}(i-\mu)}$$

where $Z_{int}$=fractional shift in range for the bin being processed
$\delta_r$=range pixel spacing
$\rho_r$=range Resolution
$\mu$=fractional Shift
N=number of columns to be processed
i=column (Range) number, i . . . N.
j=$\sqrt{-1}$ The method proceeds to decisional step 172, where the column loop counter is compared to the total number of columns. If the column loop counter is less than the total number of columns, the NO branch of decisional step 172 returns to step 168 to process the next column. If the column number is equal to the total number of columns, the YES branch of decisional step 172 leads to decisional step 174 where the Doppler bin number is compared to the total number of rows. If the Doppler bin number is less than the total number of rows, the NO branch of decisional step 174 returns to step 162 to prepare to process the next row number. If the Doppler bin number is equal to the total number of rows, the YES branch of decisional step 174 leads to decisional step 176 where the coarse image number is compared to the total number of coarse images. If the coarse image number is less than the total number of coarse images, the NO branch of decisional step 176 returns to step 160 to prepare for processing of the next coarse image. If the coarse image is equal to the total number of coarse images, the YES branch of decisional step 176 terminates the method.

After coarse image correction module 50 completes the range alignment and rotational correction of each coarse image 70, auto focus module 52 performs a phase gradient auto focus across each coarse image 70 to estimate and correct phase errors across the range aligned and rotationally corrected coarse images 70. The phase gradient auto focus utilizes prominent points 76 and a maximum likelihood estimator to estimate the change in phase across the coarse images 70 for the prominent points 76.

After coarse images 70 have been auto focused, coarse image combiner 54 combines coarse images 70 into a single high resolution image 75. Coarse image combiner 54 performs a Discrete Fourier Transform across the coarse images 70 for each bin within the coarse image. Coarse image combiner 54 next squares each bin in the combined image to yield a power, or intensity, in each bin.

Image formatter 56 takes the high resolution image 75 and prepares it for display on display device 15 by centering the radar image in the viewable area of display device 15 and transforming the power in each bin to a gray scale indicator. The resulting gray scale in each bin corresponds to the power, or intensity, of the radar return in that bin. The gray scale mapping of the bin array of the radar image gives an indication as to the shape of the target 18. The resulting gray scale mapped image is an ISAR image 58. After image formatter 56 centers the radar image and converts the bins to a gray scale indicator, ISAR image 58 may be displayed on display device 15.

It is apparent that there has been provided in accordance with the present invention a method for range alignment and rotation correction of a high resolution image in an Inverse Synthetic Aperture Radar system that satisfies the advantages set forth above. Although the present invention and its advantages have been described in detail, it should be understood that various changes, substitutions, and alterations readily apparent to those skilled in the art may be made without departing from the spirit and the scope of the present invention as defined by the following claims.

Appendix A

Derivation of Point of Rotation (Dop.ref): Doppler Centroid of prominent points used for range alignment is new point of rotation for range migration correction.

In the analysis and simulation of the range alignment function, the "zero Doppler reference" or pivot point for range migration corrections was computed as the Doppler centroid of the prominent points from the point-select function. The following is an analytical proof that this is the correct expression which is independent of location of prominent points and their location relative to the real-time range tracker reference.

The equation for the estimated range alignment in a given subaperture coarse image is a centroid—over all prominent points—of the error between the prominent point range and a range centroid of a windowed region centered at the prominent point range (this process is iterated, each time centering the window at the centroid from the previous iteration for that subaperture, and each time reducing the size of the window). This can be written as, For iteration "it",          EQ 1

$$rng\_align_{it}(v) = \frac{\sum_{k=1}^{npsel}\sum_{l=-(nwind(it)+1)/2}^{(nwind(it)+1)/2} i \cdot |x'_{Cl}(m_{ps}(k), i + i_{ps}(k) + rng\_align_{it-1}(v), v|^2}{\sum_{k=1}^{npsel}\sum_{l=-(nwind(it)+1)/2}^{(nwind(it)+1)/2} |x'_{Cl}(m_{ps}(k), i + i_{ps}(k) + rng\_align_{it-1}(v), v|^2}$$

$v = 1, 2, \ldots, NSUB$

Where rng_align$_{it}$(v)=range correction for subaperture v computed at iteration "it"
nwind(it)=size of centroid window for iteration "it"
npsel=Number of prominent points chosen
x'$_{Cl}$=Complex coarse Doppler image for subaperture v
m$_{ps}$(k)=coarse Doppler bin for prominent point k
i$_{ps}$(k)=range bin for prominent point k
υ=subaperture index For use later on in the proof, let us rearrange EQ 1 by breaking up the summation over k into segments that group the coarse Doppler bins of the prominent points together.

For the last iteration L,          EQ 2

-continued $$rng\_align_{it}(v) = \frac{\sum_{\zeta} \sum_{k3m_{ps}(k) \subset \zeta} \sum_{i=-(nwind(it)+1)/2}^{(nwind(it)+1)/2} i \cdot |x'_{Cl}(m_{ps}(k), i + i_{ps}(k) + rng\_align_{L-1}(v), v)|^2}{\sum_{k=1}^{nspel} \sum_{i=-(nwind(it)+1)/2}^{(nwind(it)+1)/2} |x'_{Cl}(m_{ps}(k), i + i_{ps}(k) + rng\_align_{L-1}(v), v)|^2}$$

where $\zeta$=set of all coarse Doppler bins containing at least one point selected as a prominent point In the numerator above, we can express the last two summations as

EQ 3

$$\sum_{k3m_{ps}(k) \subset \zeta} \sum_{i=-(nwind(it)+1)/2}^{(nwind(it)+1)/2} i \cdot |x'_{Cl}(m_{ps}(k), i + i_{ps}(k) + rng\_align_{L-1}(v), v)|^2 =$$

$$\sum_{k3m_{ps}(k) \subset \zeta} \sum_{i=-(nwind(it)+1)/2}^{(nwind(it)+1)/2} i \cdot |x'_{Cl}(m_{ps}(k), i + i_{ps}(k) + rng\_align_{L-1}(v), v)|^2 \cdot$$

$$\left\{ \frac{\sum_{k3m_{ps}(k) \subset \zeta} \sum_{i=-(nwind(it)+1)/2}^{(nwind(it)+1)/2} i \cdot |x'_{Cl}(m_{ps}(k), i + i_{ps}(k) + rng\_align_{L-1}(v), v)|^2}{\sum_{k3m_{ps}(k) \subset \zeta} \sum_{i=-(nwind(it)+1)/2}^{(nwind(it)+1)/2} i \cdot |x'_{Cl}(m_{ps}(k), i + i_{ps}(k) + rng\_align_{L-1}(v), v)|^2} \right\}$$

The term in brackets is just the estimate of the range of alignment for coarse Doppler bin $m_{ps}(k)$ which is a combination of range tracker error and range migration. We will model this as the exact quantities plus a noise term giving

EQ 4

$$\left\{ \frac{\sum_{k3m_{ps}(k) \subset \zeta} \sum_{i=-(nwind(it)+1)/2}^{(nwind(it)+1)/2} i \cdot |x'_{Cl}(m_{ps}(k), i + i_{ps}(k) + rng\_align_{L-1}(v), v)|^2}{\sum_{k3m_{ps}(k) \subset \zeta} \sum_{i=-(nwind(it)+1)/2}^{(nwind(it)+1)/2} |x'_{Cl}(m_{ps}(k), i + i_{ps}(k) + rng\_align_{L-1}(v), v)|^2} \right\} =$$

$$trk\_err(v) + rmig(m_{ps}(k), v) + n(m_{ps}(k), v)$$

where $trk\_err(v)$=true range tracker error (jitter) in subaperture $v$ and coarse Doppler bin $m_{ps}(k)$ $n(m_{ps}(k),v)$=estimation noise for subaperture $v$ and coarse Doppler bin $m_{ps}(k)$ We know that the range migration correction is of the form EQ 5

$$rmig(m,v) = [(\lambda \Delta)/(2\delta_R)][(m-\text{Dop\_}rt)/M][v-(NSUB+1)/2](\text{cells}) = (m-\text{Dop\_}rt)c_1(v)$$

where $$c_1(v) = [(\lambda \Delta)/(2\delta_R)][v-(NSUB+1)/2]/M$$

$m$ is coarse Doppler bin number $v$ is subaperture index $\delta_R$ is the range pixel dimension in meters $\lambda$ is the radar wavelength in meters $M$ is the number of pulses in a subaperture $\Delta$ is the spacing between subapertures in pulses NSUB is the number of subapertures in a full aperture Dop_tr is the coarse Dopper bin corresponding to the track point of the real-time range tracker Letting the denominator in EQ 2 be equal to $P_t(v)$ and back-substituting from EQ 5 to EQ 2, we obtain $$rng\_align_L(v) = \frac{1}{P_t(v)} \sum_{\zeta} \sum_{k3m_{ps}(k) \subset \zeta} \sum_{i=-(nwind(it)+1)/2}^{(nwind(it)+1)/2} i \cdot$$ EQ 6

$$|x'_{Cl}(m_{ps}(k), i + i_{ps}(k) + rng\_align_{L-1}(v), v)|^2 \cdot$$

$$[trk\_err(v) + rmig(m_{ps}(k), v) + n(m_{ps}(k), v)]$$

$$v = 1, 2, \ldots, NSUB$$

Let us now compute the Mean Square Error of the range alignment over all subapertures for an arbitrary Doppler index, $m'$.

$$MSE =$$ EQ-7

$$\frac{1}{NSUB} \sum_{v=1}^{NSUB} \{rng\_align_L(v) - [trk\_err(v) + (m' - \text{Dop\_}rt)c_1(v)]\}^2$$

Our goal now is to find the value of $m'$, such that the MSE is minimized. This will be the "new" range migration reference or "point of rotation." Taking the derivitive of MSE with respect to $m'$ we get $$\frac{\partial MSE}{\partial m'} = \frac{2}{NSUB} \sum_{v=1}^{NSUB} \{rng\_align_L(v) -$$ EQ-8

$$[trk\_err(v) + (m' - \text{Dop\_}rt)c_1(v)]\}) - c_1(v)) = 0$$

Solving for m' we get, $$m' = \frac{\sum_{v=1}^{NSUB} rng\_align_L(v)c_1(v) - \sum_{v=1}^{NSUB} trk\_err(v)c_1(v) + \sum_{v=1}^{NSUB} Dop\_rtc_1^2(v)}{\sum_{v=1}^{NSUB} c_1^2(v)} \quad \text{EQ-9}$$

We can now substitute EQ 6 in for $rng\_align_L$. Doing so, we obtain $$m' = \frac{1}{\sum_{v=1}^{NSUB} c_1^2(v)} \left\{ \sum_{v=1}^{NSUB} \frac{1}{P_t(v)} \sum_{\zeta} \sum_{k \ni m_{ps}(k) \subset \zeta} \sum_{i=-(nwind(it)+1)/2}^{(nwind(it)+1)/2} \right. \quad \text{EQ 10}$$

$$|x'_{Cl}(m_{ps}(k), i + i_{ps}(k) + rng\_align_{L-1}(v), v)|^2 \cdot$$

$$[trk\_err(v) + (m_{ps}(k) - Dop\_rt)c_1(v) +$$

$$\left. n(m_{ps}(k), v)]c_1(v) - \sum_{v=1}^{NSUB} trk\_err(v)c_1(v) + \sum_{v=1}^{NSUB} Dop\_rtc_1^2(v) \right\}$$

Since 1) trk_err(v) and Dop_rt are not functions of k or i, and $$\sum_{\zeta} \sum_{k \ni m_{ps}(k) \subset \zeta} \sum_{i=-(nwind(it)+1)/2}^{(nwind(it)+1)/2} \quad 2)$$

$$|x'_{Cl}(m_{ps}(k), i + i_{ps}(k) + rng\_align_{L-1}(v), v)|^2 = P_t(v)$$

and 3) the noise term is negligible (sufficiently large SNR) and zero mean, all terms containing trk_err (v) and Dop_re cancel out and $n(m_{ps}(k), v)$ vanishes. This leaves $$m' = \frac{1}{\sum_{v=1}^{NSUB} c_1^2(v)} \quad \text{EQ 11}$$

$$\sum_{v=1}^{NSUB} \frac{c_1^2(v)}{P_t(v)} \sum_{\zeta} \sum_{k \ni m_{ps}(k) \subset \zeta} \sum_{i=-(nmind(it)+1)/2}^{(nmind(it)+1)/2}$$

$$|x'_{Cl}(m_{ps}(k), i + i_{ps}(k) + rgn\_align_{L-1}(v), v)|^2 = m_{ps}(k)$$

Equation 11 is the most general form of the solution for the case where SNR is sufficiently large. All of the terms in the equation are readily available in processing. We can simplify Equation 11, however, if we make the assumption that the sum of the powers of all selected points in a given coarse Doppler bin does not change much from subaperture to subaperture. This is a valid assumption since the point selection process chooses strong non-fluctuating points and the summation will reduce the fluctuation even more. This assumption makes the magnitude-squared term in the last summation and Pt(v) independent of v. Let us replace them with the entries from the integrated coarse image power used to select prominent points—this is equivalent to using an average value over all subapertures. Doing so we obtain $$m' = \frac{\sum_{v=1}^{NSUB} c_1^2(v)}{\sum_{v=1}^{NSUB} c_1^2(v) \sum_{k=1}^{npsel} Powsum(m_{ps}(k), i_{ps}(k))} \quad \text{EQ 12}$$

We can see that the $$\sum_{v=1}^{NSUB} c_1^2(v)$$

terms cancel and by combining the second two summations in the numerator into one, we obtain $$Dop.ref = \frac{\sum_{k=1}^{npsel} Powsum(m_{ps}(k), i_{ps}(k))m_{ps}(k)}{\sum_{k=1}^{npsel} Powsum(m_{ps}(k), i_{ps}(k))} \quad \text{EQ 13}$$

this is simply the Doppler centroid of all prominent points in the integrated coarse image power array which is what we set out to prove. The conclusion is that EQ 2 (range alignment) and EQ 5 (range migration) can be applied simultaneously to correct for translational and rotational range misalignments and the center of rotation can be computed very accurately from EQ 13.

What is claimed is:

1. An Inverse Synthetic Aperture Radar imaging method, comprising:
    generating a plurality of coarse images in response to receiving a full aperture of range compressed data samples, each coarse image generated from an overlapping subaperture of the range compressed data samples and containing a radar image of a target;
    selecting prominent points within each of the plurality of coarse images;
    aligning the radar images of the plurality of coarse images using the prominent points to remove translational movement and range migration between coarse images;
    removing phase errors between the plurality of coarse images using a phase gradient autofocus;
    combining the plurality of coarse images to form a high resolution image; and
    formatting the high resolution image for display on a display device.

2. The method of claim 1 wherein the step of selecting prominent points includes:
    generating a composite magnitude image and a composite power image form the plurality of coarse images;
    locating prominent points in the composite power image by identifying bins with radar return intensity greater than a first threshold and variance below a second threshold.

3. The method of claim 1 wherein the step of formatting the high resolution image includes:
    centering the high resolution image in a viewable area of the display device; and
    mapping a value in each bin of the high resolution image to a gray scale corresponding to an intensity value of the bin.

4. An Inverse Synthetic Aperture Radar imaging method, comprising:

generating a plurality of coarse images in response to receiving a full aperture of range compressed data samples, each coarse image generated from an overlapping subaperture of the range compressed data samples and containing a radar image of a target;

selecting prominent points from the plurality of coarse images;

aligning the radar images on the plurality of coarse images using the prominent points to remove translational movement and range migration between coarse images;

removing phase errors between the plurality of coarse images using a phase gradient autofocus;

combining the plurality of coarse images to form a high resolution image;

formatting the high resolution image for display on a display device;

wherein the step of aligning the radar images includes:

locating the prominent points on each of the plurality of coarse images;

calculating a range alignment factor for each coarse image, the range alignment factor indicating direction and magnitude of a shift in the radar image to place the prominent points in the same relative location on each of the coarse images;

calculating a rotational correction factor for each column in each coarse image to compensate for range migration; and applying the range alignment factors and the rotational correction factors to each coarse image.

5. The method of claim 4, wherein the step of calculating a range alignment factor for each coarse image, includes:

placing a range window in a range area where each prominent point is expected to be located;

calculating a prominent point centroid of bins within the range window, the centroid identifying the location of the prominent point;

calculating an overall centroid of the prominent point centroids, the overall centroid indicating a shift in range to range align the plurality of coarse images; and reducing the range window size and repeating the calculating a range alignment factor step until the difference between the previous overall centroid and the current overall centroid does not exceed a third threshold value.

6. The method of claim 4, wherein the step of calculating a rotation correction factor includes:

locating a radar image pivot point by calculating a centroid of the prominent points in a composite power image; and calculating the rotation correction factor using the radar image pivot point.

7. A method of range aligning and rotationally correcting radar image errors in an Inverse Synthetic Aperture Radar system, comprising:

dividing a full aperture of radar pulse return data into a plurality of overlapping subapertures, each overlapping subaperture including a coarse radar image formed from a plurality of radar pulse returns;

determining one or more prominent points from the overlapping subapertures;

locating the prominent points in each overlapping subaperture;

calculating a range alignment factor for each overlapping subaperture from the location of the prominent points in each overlapping subaperture, the range alignment factor indicating a shift in the radar image to align the prominent points in each overlapping subaperture;

calculating a rotation correction factor for each column in the coarse radar image in each overlapping subaperture, the rotation correction factor removing Doppler frequency shifts from the coarse radar image;

applying the range alignment factors and the rotation correction factors to the plurality of overlapping subapertures; and combining the plurality of overlapping subapertures into a single high resolution image for display on a display device.

8. The method of claim 7, wherein the step of applying the range alignment factors and the rotation correction factors includes:

summing the range alignment factor for each overlapping subaperture and the rotational correction factor for each column in each overlapping subaperture giving a total correction; and shifting the radar image in each overlapping subaperture by the direction and magnitude indicated by the total correction.

9. The method of claim 7, further comprising:

generating a composite magnitude image and a composite power image from the plurality of overlapping subapertures, the composite magnitude image and the composite power image used to determine the one or more prominent points.

10. An Inverse Synthetic Aperture Radar imaging system, comprising:

a coarse image generator operable to receive a full aperture of range compressed received reflected radar pulses and to create a plurality of coarse images from overlapping subapertures of the range compressed received reflected radar pulses, the coarse images including a radar image of a target;

a composite image generator operable to create a composite magnitude image by combining the data in the plurality of coarse images and a composite power image by combining the squares of the data in the plurality of coarse images;

a point select module operable to select one or more prominent points in the range compressed received reflected radar pulses by identifying bins with an intensity above a first threshold and a variance below a second threshold using the composite magnitude image and the composite power image;

an adjustment module operable to align the radar images in the plurality of coarse images in the same relative range location, the adjustment module further operable to remove range migration from the plurality of coarse images;

an autofocus module operable to apply a phase gradient autofocus to the plurality of coarse images to correct phase errors across the range aligned and rotationally corrected coarse images;

a coarse image combiner operable to combine the plurality of coarse images into a single high resolution image; and an image formatter operable to prepare the single high resolution image for display on a display device.

11. The system of claim 10, wherein the adjustment module further comprises:

a range alignment module operable to determine a range alignment factor for each coarse image;

a rotational correction module operable to determine a rotation correction factor along a Doppler frequency axis to remove range migration from each coarse image; and a coarse image correction module operable to shift the radar image in each of the plurality of coarse images using the range alignment factors and the rotation correction factor.

12. A method for aligning a plurality of coarse images in an inverse Synthetic Aperture Radar system, comprising:

selecting prominent points from a plurality of coarse images, each coarse image containing a radar image of a target;

locating the prominent points on each of the plurality of coarse images;

calculating a range alignment factor for each coarse image, the range alignment factor indicating direction and magnitude of a shift in the radar image to place the prominent points in the same relative location on each of the coarse images;

calculating a rotational correction factor for each column in each coarse image to compensate for range migration; and applying the range alignment factors and the rotational correction factors to each coarse image.

13. The method of claim 12, wherein the step of calculating a range alignment factor for each coarse image, includes:

placing a range window in a range area where each prominent point is expected to be located;

calculating a prominent point centroid of bins within the range window, the centroid identifying the location of the prominent point;

calculating an overall centroid of the prominent point centroids, the overall centroid indicating a shift in range to range align the plurality of coarse images; and reducing the range window size and repeating the calculating a range alignment factor step until the difference between the previous overall centroid and the current overall centroid does not exceed a third threshold value.

14. The method of claim 12, wherein the step of calculating a rotation correction factor includes:

locating a radar image pivot point by calculating a centroid of the prominent points in a composite power image; and calculating the rotation correction factor using the radar image pivot point.

* * * * *

UNITED STATES PATENT AND TRADEMARK OFFICE
CERTIFICATE OF CORRECTION

PATENT NO. : 6,255,981 B1
DATED : July 4, 2001
INVENTOR(S) : Raymond Samaniego et al.

It is certified that error appears in the above-identified patent and that said Letters Patent is hereby corrected as shown below:

Column 7,
Line 33, after "where", insert -- FIR_taps = lowpass filter with cutoff frequency $f_c$ --.

Column 8,
Line 23, after "The", delete "it".
Line 28, The portion of the formula reading ($m$-/Dop_ref) should read -- ($m$-Dop_ref). --

Column 10,
Lines 35-45, delete "

$$rng\_align_{it}(V) = \frac{\sum_{k=1}^{npsel} \sum_{i=-(nwind(it)+1)/2}^{(nwind(it)+1)/2} i \cdot \left| x_{CI}^{'}(m_{ps}(k), i + i_{ps}(k) + rng\_align_{it-1}(v), v) \right|^2}{\sum_{k=1}^{npsel} \sum_{i=-(nwind(it)+1)/2}^{(nwind(it)+1)/2} \left| x_{CI}^{'}(m_{ps}(k), i + i_{ps}(k) + rng\_align_{it-1}(v), v) \right|^2}$$

", and insert --

$$rng\_align_{it}(V) = \frac{\sum_{k=1}^{npsel} \sum_{i=-(nwind(it)+1)/2}^{(nwind(it)+1)/2} i \cdot \left| x_{CI}^{'}(m_{ps}(k), i + i_{ps}(k) + rng\_align_{it-1}(v), v) \right|^2}{\sum_{k=1}^{npsel} \sum_{i=-(nwind(it)+1)/2}^{(nwind(it)+1)/2} \left| x_{CI}^{'}(m_{ps}(k), i + i_{ps}(k) + rng\_align_{it-1}(v), v) \right|^2}$$

Column 11,
Lines 1-10, delete "

$$rng\_align_{it}(v) = \frac{\sum_{\zeta} \sum_{k \ni m_{ps}(k) \subset \zeta} \sum_{i=-(nwind(it)+1)/2}^{(nwind(it)+1)/2} i \cdot \left| x_{CI}^{'}(m_{ps}(k), i + i_{ps}(k) + rng\_align_{L-1}(v), v) \right|^2}{\sum_{k=1}^{npsel} \sum_{i=-(nwind(it)+1)/2}^{(nwind(it)+1)/2} \left| x_{CI}^{'}(m_{ps}(k), i + i_{ps}(k) + rng\_align_{L-1}(v), v) \right|^2}$$

", and insert --

$$rng\_align_{it}(v) = \frac{\sum_{\zeta} \sum_{k \ni m_{ps}(k) \subset \zeta} \sum_{i=-(nwind(it)+1)/2}^{(nwind(it)+1)/2} i \cdot \left| x_{CI}^{'}(m_{ps}(k), i + i_{ps}(k) + rng\_align_{L-1}(v), v) \right|^2}{\sum_{k=1}^{npsel} \sum_{i=-(nwind(it)+1)/2}^{(nwind(it)+1)/2} \left| x_{CI}^{'}(m_{ps}(k), i + i_{ps}(k) + rng\_align_{L-1}(v), v) \right|^2}$$

--.

UNITED STATES PATENT AND TRADEMARK OFFICE
CERTIFICATE OF CORRECTION

PATENT NO. : 6,255,981 B1
DATED : July 4, 2001
INVENTOR(S) : Raymond Samaniego et al.

It is certified that error appears in the above-identified patent and that said Letters Patent is hereby corrected as shown below:

<u>Column 11,</u>
Lines 16-32, delete "

$$\sum_{k3m_{ps}(k)\subset\zeta} \sum_{i=-(nwind(it)+1)/2}^{(nwind(it)+1)/2} i \cdot | x_{CI}^{'}(m_{ps}(k), i+i_{ps}(k)+rng\_align_{L-1}(v), v |^2 =$$

$$\sum_{k3m_{ps}(k)\subset\zeta} \sum_{i=-(nwind(it)+1)/2}^{(nwind(it)+1)/2} i \cdot | x_{CI}^{'}(m_{ps}(k), i+i_{ps}(k)+rng\_align_{L-1}(v), v |^2 \cdot$$

$$\left\{ \frac{\sum_{k3m_{ps}(k)\subset\zeta} \sum_{i=-(nwind(it)+1)/2}^{(nwind(it)+1)/2} i \cdot \left| x_{CI}^{'}(m_{ps}(k), i+i_{ps}(k)+rng\_align_{L-1}(v), v \right|^2}{\sum_{k3m_{ps}(k)\subset\zeta} \sum_{i=-(nwind(it)+1)/2}^{(nwind(it)+1)/2} i \cdot \left| x_{CI}^{'}(m_{ps}(k), i+i_{ps}(k)+rng\_align_{L-1}(v), v \right|^2} \right\}$$

", and insert --

$$\sum_{k3m_{ps}(k)\subset\zeta} \sum_{i=-(nwind(it)+1)/2}^{(nwind(it)+1)/2} i \cdot \left| x_{CI}^{'}\bigl(m_{ps}(k), i+i_{ps}(k)+rng\_align_{L-1}(v), v\bigr) \right|^2 =$$

$$\sum_{k3m_{ps}(k)\subset\zeta} \sum_{i=-(nwind(it)+1)/2}^{(nwind(it)+1)/2} i \cdot \left| x_{CI}^{'}\bigl(m_{ps}(k), i+i_{ps}(k)+rng\_align_{L-1}(v), v\bigr) \right|^2 \cdot$$

$$\left\{ \frac{\sum_{k3m_{ps}(k)\subset\zeta} \sum_{i=-(nwind(it)+1)/2}^{(nwind(it)+1)/2} i \cdot \left| x_{CI}^{'}\bigl(m_{ps}(k), i+i_{ps}(k)+rng\_align_{L-1}(v), v\bigr) \right|^2}{\sum_{k3m_{ps}(k)\subset\zeta} \sum_{i=-(nwind(it)+1)/2}^{(nwind(it)+1)/2} \left| x_{CI}^{'}\bigl(m_{ps}(k), i+i_{ps}(k)+rng\_align_{L-1}(v), v\bigr) \right|^2} \right\}$$

-- .

<u>Column 11,</u>
Lines 38-49, delete "

$$\left\{ \frac{\sum_{k3m_{ps}(k)\subset\zeta} \sum_{i=-(nwind(it)+1)/2}^{(nwind(it)+1)/2} i \cdot \left| x_{CI}^{'}(m_{ps}(k), i+i_{ps}(k)+rng\_align_{L-1}(v), v \right|^2}{\sum_{k3m_{ps}(k)\subset\zeta} \sum_{i=-(nwind(it)+1)/2}^{(nwind(it)+1)/2} \left| x_{CI}^{'}(m_{ps}(k), i+i_{ps}(k)+rng\_align_{L-1}(v), v \right|^2} \right\} =$$

$$trk\_err(v) + rmig(m_{ps}(k), v) + n(m_{ps}(k), v)$$

".

and insert --

$$\left\{ \frac{\sum_{k3m_{ps}(k)\subset\zeta} \sum_{i=-(nwind(it)+1)/2}^{(nwind(it)+1)/2} i \cdot \left| x_{CI}^{'}\bigl(m_{ps}(k), i+i_{ps}(k)+rng\_align_{L-1}(v), v\bigr) \right|^2}{\sum_{k3m_{ps}(k)\subset\zeta} \sum_{i=-(nwind(it)+1)/2}^{(nwind(it)+1)/2} \left| x_{CI}^{'}\bigl(m_{ps}(k), i+i_{ps}(k)+rng\_align_{L-1}(v), v\bigr) \right|^2} \right\} =$$

$$trk\_err(v) + rmig(m_{ps}(k), v) + n(m_{ps}(k), v)$$

UNITED STATES PATENT AND TRADEMARK OFFICE
CERTIFICATE OF CORRECTION

PATENT NO. : 6,255,981 B1
DATED : July 4, 2001
INVENTOR(S) : Raymond Samaniego et al.

It is certified that error appears in the above-identified patent and that said Letters Patent is hereby corrected as shown below:

Column 12,
Line 10, after "coarse," delete "Dopper", and insert -- Doppler --.
Lines 35-40, delete "

$$rng\_align_L(v) = \frac{1}{P_i(v)} \sum_{\zeta} \sum_{k \ni m_{pi}(k) \subset \zeta} \sum_{i = -(nwind(ii)+1)/2}^{(nwind(ii)+1)/2} i \cdot \left| x'_{Ci}(m_{pi}(k), i+i_{pi}(k)) + rng\_align_{L-1}(v), v \right|^2 \cdot [trk\_err(v) + rmig(m_{pi}(k), v) + n(m_{pi}(k), v)]$$

$$v = 1, 2, \ldots, NSUB$$
", and insert --

$$rng\_align_{L-1}(v) = \frac{1}{P_i(v)} \sum_{\zeta} \sum_{k \ni m_{pi}(k) \subset \zeta} \sum_{i = -(nwind(ii)+1)/2}^{(nwind(ii)+1)/2} i \cdot \left| x'_{Ci}(m_{pi}(k), i+i_{pi}(k)) + rng\_align_{L-1}(v), v \right|^2 \cdot [trk\_err(v) + rmig(m_{pi}(k), v) + n(m_{pi}(k), v)]$$

$$v = 1, 2, \ldots, NSUB$$
--.

Column 12,
Lines 50-55, delete "

$$MSE = \frac{1}{NSUB} \sum_{v=1}^{NSUB} \left\{ rng\_align_L(v) - [trk\_err(v) + (m' - Dop\_rt)c_i(v)] \right\}^2$$
", and insert --

$$MSE = \frac{1}{NSUB} \sum_{v=1}^{NSUB} \left\{ rng\_align_{L-1}(v) - [trk\_err(v) + (m' - Dop\_rt)c_i(v)] \right\}^2$$
--.

Column 12,
Lines 61-65, delete, "

$$\frac{\partial MSE}{\partial m'} = \frac{2}{NSUB} \sum_{v=1}^{NSUB} \{rng\_align_L(v) - [trk\_err(v) + (m' - Dop\_rt)c_i(v)]\}) - c_i(v)) = 0$$
", and insert --

$$\frac{\partial MSE}{\partial m'} = \frac{2}{NSUB} \sum_{v=1}^{NSUB} \{rng\_align_{L-1}(v) - [trk\_err(v) + (m' - Dop\_rt)c_i(v)]\}(-c_i(v)) = 0$$
--.

UNITED STATES PATENT AND TRADEMARK OFFICE
CERTIFICATE OF CORRECTION

PATENT NO. : 6,255,981 B1
DATED : July 4, 2001
INVENTOR(S) : Raymond Samaniego et al.

It is certified that error appears in the above-identified patent and that said Letters Patent is hereby corrected as shown below:

Column 13,
Lines 5-10, delete "

$$m' = \frac{\sum_{v=1}^{NSUB} rng\_align_L(v)c_1(v) - \sum_{v=1}^{NSUB} trk\_err(v)c_1(v) + \sum_{v=1}^{NSUB} Dop\_rtc_1^2(v)}{\sum_{v=1}^{NSUB} c_1^2(v)}$$

", and insert --

$$m' = \frac{\sum_{v=1}^{NSUB} rng\_align_{L-1}(v)c_1(v) - \sum_{v=1}^{NSUB} trk\_err(v)c_1(v) + \sum_{v=1}^{NSUB} Dop\_rt\, c_1^2(v)}{\sum_{v=1}^{NSUB} c_1^2(v)}$$

--.

Column 13,
Lines 15-25, delete "

$$m' = \frac{1}{\sum_{v=1}^{NSUB} c_1^2(v)} \left\{ \sum_{v=1}^{NSUB} \frac{1}{P_i(v)} \sum_{\zeta} \sum_{k \ni m_{ps}(k) \subset \zeta} \sum_{i=-(nwind(it)+1)/2}^{(nwind(it)+1)/2} \left| x'_{Cl} m_{ps}(k), i + i_{ps}(k) + rng\_align_{L-1}(v), v \right|^2 \cdot \right.$$
$$[trk\_err(v) + (m_{ps}(k) - Dop\_rt)c_1(v) +$$
$$\left. n(m_{ps}(k),v)]c_1(v) - \sum_{v=1}^{NSUB} trk\_err(v)c_1(v) + \sum_{v=1}^{NSUB} Dop\_rtc_1^2(v) \right\}$$

", and insert --

$$m' = \frac{1}{\sum_{v=1}^{NSUB} c_1^2(v)} \left\{ \sum_{v=1}^{NSUB} \frac{1}{P_i(v)} \sum_{\zeta} \sum_{k \ni m_{ps}(k) \subset \zeta} \sum_{i=-(nwind(it)+1)/2}^{(nwind(it)+1)/2} \left| x'_{Cl}(m_{ps}(k), i + i_{ps}(k) + rng\_align_{L-1}(v), v) \right|^2 \right.$$
$$[trk\_err(v) + (m_{ps}(k) - Dop\_rt)c_1(v) +$$
$$\left. n(m_{ps}(k),v)]c_1(v) - \sum_{v=1}^{NSUB} trk\_err(v)c_1(v) + \sum_{v=1}^{NSUB} Dop\_rt\, c_1^2(v) \right\}$$

--.

UNITED STATES PATENT AND TRADEMARK OFFICE
CERTIFICATE OF CORRECTION

PATENT NO. : 6,255,981 B1
DATED : July 4, 2001
INVENTOR(S) : Raymond Samaniego et al.

It is certified that error appears in the above-identified patent and that said Letters Patent is hereby corrected as shown below:

Column 13,
Lines 31-40, delete "
Since
1) trk_err(v) and Dop_rt are not functions of k or i, and 2) $$\sum_{\zeta} \sum_{k3m_{ps}(k) \subset \zeta} \sum_{i=-(nwind(it)+1)/2}^{(nwind(it)+1)/2} \left| x'_{CI}(m_{ps}(k), i+i_{ps}(k) + rng\_align_{L-1}(v), v) \right|^2 = P_t(v)$$

and 3) the noise term is negligible (sufficiently large SNR) and zero mean, all terms containing trk_err (v) and Dop_re cancel out and n(m$_{ps}$ (k), v) vanishes. This leaves,"
and insert --
Since
1) trk_err(v) and Dop_rt are not functions of k or i, and 2) $$\sum_{\zeta} \sum_{k3m_{ps}(k) \subset \zeta} \sum_{i=-(nwind(it)+1)/2}^{(nwind(it)+1)/2} \left| x'_{CI}(m_{ps}(k), i+i_{ps}(k) + rng\_align_{L-1}(v), v) \right|^2 = P_t(v)$$

and 3) the noise term is negligible (sufficiently large SNR) and zero mean, all terms containing trk_err(v) and Dop_rt cancel out and n(m$_{ps}$ (k), v) vanishes. This leaves --

Column 13,
Lines 42-50, delete "

$$m' = \frac{1}{\sum_{v=1}^{NSUB} c_1^2(v)} \sum_{v=1}^{NSUB} \frac{c_1^2(v)}{P_t(v)} \sum_{\zeta} \sum_{k3m_{ps}(k) \subset \zeta} \sum_{i=-(nmind(it)+1)/2}^{(nmind(it)+1)/2} \left| x'_{CI}(m_{ps}(k), i+i_{ps}(k) + rgn\_align_{L-1}(v), v) \right|^2 = m_{ps}(k)$$

", and insert --

$$m' = \frac{1}{\sum_{v=1}^{NSUB} c_1^2(v)} \sum_{v=1}^{NSUB} \frac{c_1^2(v)}{P_t(v)} \sum_{\zeta} \sum_{k3m_{ps}(k) \subset \zeta} \sum_{i=-(nwind(it)+1)/2}^{(nwind(it)+1)/2} \left| x'_{CI}(m_{ps}(k), i+i_{ps}(k) + rng\_align_{L-1}(v), v) \right|^2 = m_{ps}(k)$$

--.

UNITED STATES PATENT AND TRADEMARK OFFICE
CERTIFICATE OF CORRECTION

PATENT NO. : 6,255,981 B1
DATED : July 4, 2001
INVENTOR(S) : Raymond Samaniego et al.

It is certified that error appears in the above-identified patent and that said Letters Patent is hereby corrected as shown below:

Column 13,
Line 64, after "and", delete "Pt(v)", and insert -- $P_t(v)$ --.

Column 14,
Lines 1-10, delete "
$$m' = \frac{\sum_{\zeta} \sum_{k \ni m_{ps}(k) \propto \zeta} Powsum(m_{ps}(k), i_{ps}(k)) m_{ps}(k) \sum_{v=1}^{NSUB} c_1^2(v)}{\sum_{v=1}^{NSUB} c_1^2(v) \sum_{k=1}^{npsel} Powsum(m_{ps}(k), i_{ps}(k))}$$
", and insert --
$$m' = \frac{\sum_{v=1}^{NSUB} c_1^2(v) \sum_{\zeta} \sum_{k \ni m_{ps}(k) \subset \zeta} Powsum(m_{ps}(k), i_{ps}(k)) m_{ps}(k)}{\sum_{v=1}^{NSUB} c_1^2(v) \sum_{k=1}^{npsel} Powsum(m_{ps}(k), i_{ps}(k))}$$
--.

Column 14,
Line 56, after "image", delete "form", and insert -- from --.

Column 17,
Line 12, after "an", delete "inverse", and insert -- Inverse --.

Signed and Sealed this

Fifth Day of February, 2002

Attest:

*Attesting Officer*

JAMES E. ROGAN
*Director of the United States Patent and Trademark Office*